Dec. 11, 1928.  1,694,913
B. F. FITCH
FREIGHT HANDLING APPARATUS
Filed Aug. 16, 1926   3 Sheets-Sheet 2
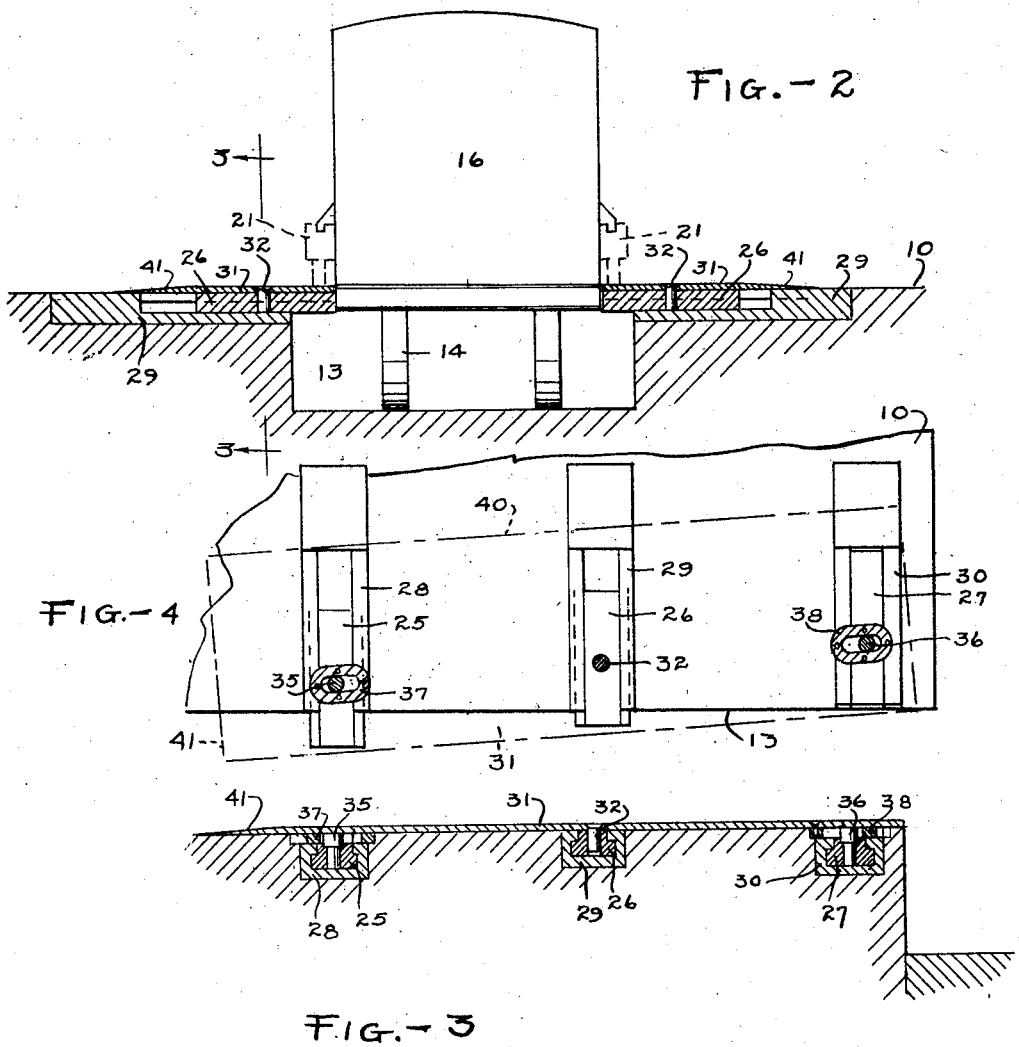

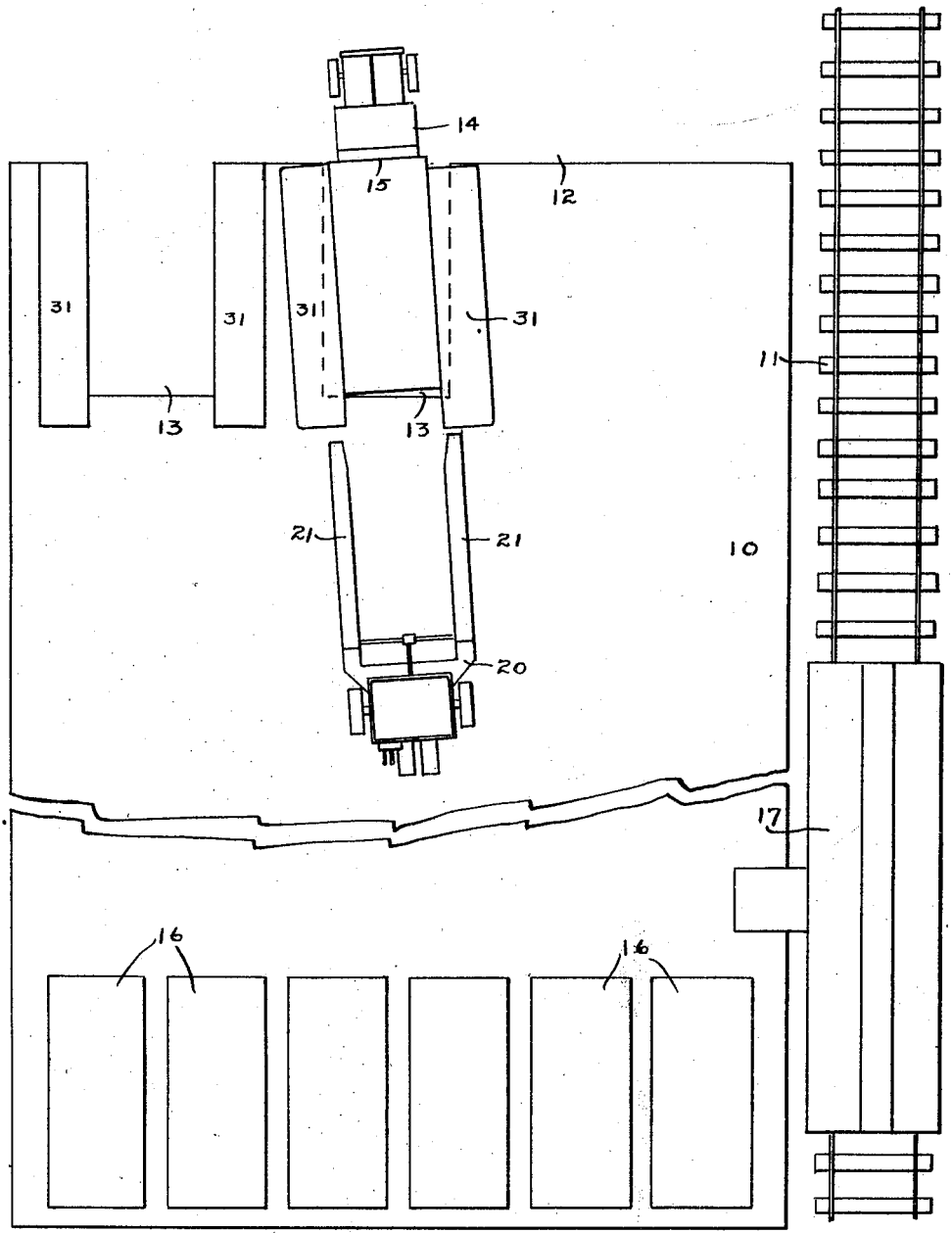

Dec. 11, 1928.
B. F. FITCH
1,694,913
FREIGHT HANDLING APPARATUS
Filed Aug. 16, 1926      3 Sheets-Sheet 3
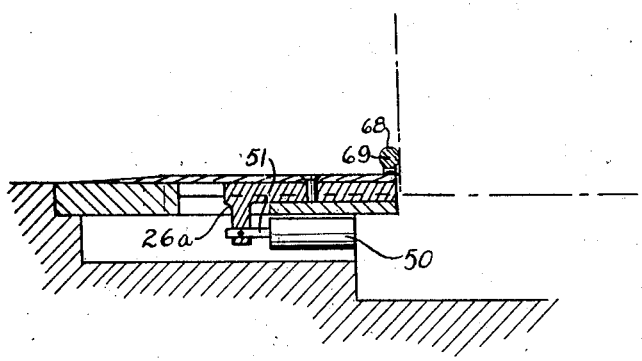
FIG.—5
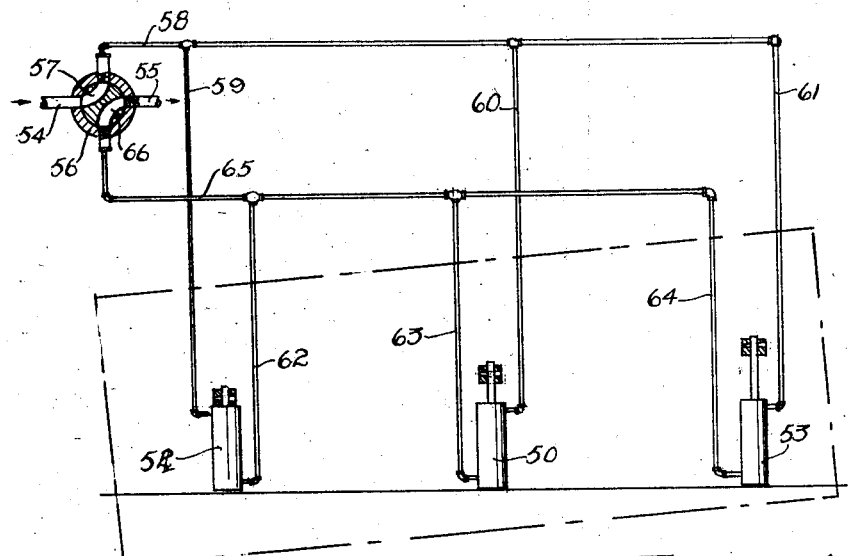
FIG.—6
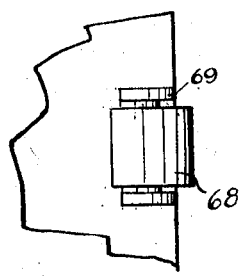
FIG.—7
Inventor
Benjamin F. Fitch
By Bates Macklin Bobrick & Pease
Attorneys Patented Dec. 11, 1928.

1,694,913

UNITED STATES PATENT OFFICE.

BENJAMIN F. FITCH, OF NEW YORK, N. Y., ASSIGNOR TO MOTOR TERMINALS COMPANY, OF WILMINGTON, DELAWARE, A CORPORATION OF DELAWARE.

FREIGHT-HANDLING APPARATUS.

Application filed August 16, 1926. Serial No. 129,470.

This invention relates to apparatus for handling freight which is stored in containers comprising removable automobile bodies. The weight of a removable automobile body when loaded with freight is such that an overhead crane is usually employed for transferring the bodies between a truck and a platform. An overhead crane however is not adapted for use in every location, and in such places an industrial power lift truck may be employed to good advantage. A truck of this nature is illustrated, described and claimed in my copending application, Serial Number 122,310, filed July 14, 1926.

Briefly the industrial truck shown in my copending application includes a pair of arms which are arranged to extend along opposite sides of a removable truck body, and also has mechanism associated therewith for raising the body a slight distance from its support, and then transporting it to any desired place on the platform, or to a truck alongside the platform. Frequently, particularly in permanent installations it is desirable to use a truck pit along one edge of the platform, but due to the fact that it is impractical to position a truck at all times within a narrow pit in exactly the same place, the pit of necessity must be at least two feet wider than the width of the truck.

The difference in width between the truck and pit prevents the satisfactory use of a power lift truck set forth in my above mentioned application since to be effective, the arms of the truck must be in close fitting engagement with the sides of the body in order to support the great weight of a loaded body.

The principal object of the present invention therefore is to provide means for enabling a power lift truck to closely engage a load, and yet to permit the use of a truck pit which is materially wider than the width of a motor truck. In this connection, my invention contemplates the provision of a shiftable trackway which normally does not obstruct the runway in the pit, yet is adapted to be shifted with reference to the platform to provide a continuation of the same over part of the runway, whereby a power lift truck may travel alongside the truck body and sufficiently close thereto, for raising the body from the vehicle frame.

In the drawings, Fig. 1 is a plan view showing a platform layout including my invention; Fig. 2 is a vertical cross-sectional view across the platform adjacent one of the truck pits; Fig. 3 is a section taken on a plane indicated by the line 3—3 in Fig. 2; and Fig. 4 is a plan view showing one of the shiftable trackways in extended position with the trackway plate removed, but shown diagrammatically. Figs. 5 to 7 are details of a modification.

In Fig. 1, I have illustrated a freight platform 10 with a set of railway tracks 11 extending along one side thereof, and with a street or truck runway 12 extending along one end thereof. Truck pits, indicated at 13, lead from the runway for receiving motor trucks. One of such trucks is indicated at 14 as having a removable body 15 thereon and as being positioned in the truck pit. Other removable bodies are indicated at 16 upon the platform adjacent a railway car 17 and in such position that freight may be transported by hand between the bodies and car in the usual way. A power lift industrial truck, indicated in general at 20 is shown on the platform near the truck pit, in which the truck 14 is positioned, and as being about to be moved into engagement with the body for raising it from the truck and depositing it upon the platform.

The truck shown in Fig. 1 is disposed at an oblique angle with reference to the pit. In order therefore to permit the arms 21 on the truck 20 to travel alongside of and closely to the body 15, it is necessary to provide some support across the intervening part of the truck pit. To this end I employ shiftable trackways which normally can be moved away from the edges of the truck pit for enabling a truck to be backed into the pit with little difficulty, and then may be shifted across the intervening space into close fitting engagement with the truck for providing substantially a continuation of the platform along opposite sides of the load.

The preferred arrangement of shiftable trackways embodies three beams indicated at 25, 26 and 27 which are shiftable in guide beams 28, 29 and 30 respectively on each side of the pit. The guide beams are fastened in any suitable way to the platform, and are so arranged that the outer ends thereof terminate substantially flush with the truck pit walls. Each set of shiftable beams carries a floor plate 31 in such manner that the edge of the plate adjacent the truck may be disposed at an oblique angle to the side wall of the pit. To accomplish this, the plate is shown as being pivotally mounted at 32 to the center beam, and as having a pin and slot connection with the end beams 25 and 27 respectively. The center connection preferably extends entirely through the plate 21 while the pin and slot connections are preferably disposed on the underside of the plate. A satisfactory pin and slot connection may be made by mounting a pin as at 35 and 36 rigidly in the beams 25 and 27 respectively, and by mounting slotted plates 37 and 38 rigidly on the underside of the plate 31. The length of the slot is sufficient to permit the desired degree of angularity between the plate and pit wall.

The edge of each plate has an apron portion extending along one side and end thereof as at 40 and 41 to cover the opening in the floor of the platform, when the movable beams are shifted with reference to the platform. Moreover the edge of each apron portion may be tapered to provide a slight ramp upon which the forward wheels of a power lift truck may travel.

In Figs. 2 and 3 the shiftable trackways are shown as being arranged to be operated by hand. Where desired, however, power actuated means may be employed for shifting the trackway with reference to the platform. In Fig. 5 I have illustrated a hydraulic cylinder 50 which is operatively connected as by plunger rod 51, to the telescopic beam 26ª.

In Fig. 6 three telescopic beams are illustrated as each having a cylinder 50, 52 and 53 respectively associated therewith. A common inlet supply conduit 54, and a common outlet supply conduit 55, with a valve 56 provides a connection through the cylinders in the desired direction. Any suitable source of supply (not shown) may be used for supplying fluid under pressure. In Fig. 6 the valve is illustrated as being turned in such manner that fluid will flow through the passageway 57 and thence through pipe 58, which is operatively connected through pipes 59, 60 and 61 to the respective cylinders. While the valve is in this position, the fluid pressure will urge the plungers and therefore the associated trackways against a vehicle body which may be disposed upon a track in the runway. While the plungers are being urged outwardly fluid on the discharge side of the plungers will flow through the respective conduits 62, 63 and 64 to a common return 65, thence through the passageway 66 and to a discharge reservoir (not shown) at the end of conduit 55.

The valve 66 may be turned so as to bring the passageway 66 into communication with the conduits 54 and 65. Then the plunger will be urged in the opposite direction and the trackway will be returned to normal position. For installations where power means are employed for shifting the trackway, a plurality of buffer rollers may be mounted on each edge of the trackway so as to permit raising of the body from the truck without causing the sides of the body to be scraped by the edges of the trackway. Each roller may be mounted on the plate adjacent the ends of the telescopic beams as shown at 68 in Figs. 5 and 7 respectively. These views show a U shaped bracket 69 which is fastened onto the plate, and also show a roller the diameter of which is sufficiently great to permit part of the roller to overhang the edge of the plate.

Assuming that a truck has entered a truck pit with a load, then the shiftable trackways are maintained in the normal position so as to leave substantially the entire space of the truck pit for the truck to enter. After the truck has been brought to a stop, then the trackways are shifted either by hand or by power until the edges thereof engage the sides of the body or truck. The industrial truck 20 having the spaced arms 21 is then caused to travel across the trackways and to straddle the load. The industrial truck is then operated to raise the body from the motor truck and to transport it to some position on the platform. Another industrial truck having either an empty or a loaded body may then enter the trackways and deposit it upon the waiting motor vehicle. This minimizes the period during which the truck must remain idle. Thereafter, the power lift truck is backed off the trackway, the trackways are returned to normal position and the motor vehicle is driven away from the platform.

An important advantage of my invention is the fact that I may effect the transfer of a loaded body between a truck and platform, without necessitating the use of overhead cranes and without requiring the motor truck to be absolutely aligned with the walls of a truck pit.

I claim:

1. In combination, a freight platform, a truck runway adjacent thereto, and means associated with the platform and movable with reference thereto for providing an extension of the platform along opposite sides of a truck positioned on the runway.

2. In combination, a platform, a truck runway adjacent thereto, a member adjacent the runway and shiftable with reference to the platform for providing a continuation of the platform alongside a truck positioned on the runway, and means for supporting said member independently of said truck.

3. The combination with a platform having a truck pit along one edge thereof, a pair of members carried by the platform and shiftable with reference thereto for providing a continuation of the platform over part of the runway and on opposite sides of a truck positioned in the pit, and means associated with the platform for holding the member in over-hanging position.

4. In combination, a freight platform, a truck pit adjacent one edge of the platform, a motor vehicle having a removable body adapted to enter said truck pit, a power lift truck on said platform arranged to straddle the body and to lift it from the vehicle and means shiftable with reference to the platform for providing a support for the power lift truck on opposite sides of said vehicle and over part of the truck runway.

5. In combination, a freight platform, a truck runway adjacent one edge of the platform, a motor vehicle positioned on the runway and having a removable body associated therewith, a power lift truck having spaced arms arranged to extend along opposite sides of the vehicle and to raise the body therefrom and oppositely acting shiftable members for providing a trackway for said truck alongside said vehicle and over part of said runway.

6. In combination, a freight platform, a truck pit associated therewith, a motor vehicle having a width materialy less than the width of the pit, a power lift truck having load engaging arms which are adapted to closely engage the sides of the body, mechanism on the truck for raising the body from a vehicle, and a shiftable member on each side of the truck pit, said members providing a continuation of the platform surface and also a trackway over the truck pit for enabling the arms of said power lift truck to extend alongside of and in close proximity to said body.

7. In combination, a freight platform, a truck pit, and a laterally shiftable member on each side of the truck pit, said members providing a continuation of the platform surface over part of the truck pit, and in close proximity to the sides of a truck positioned on said runway.

8. In combination, a freight platform, a truck runway, a truck positioned on the runway and having a removable body associated therewith, and a shiftable member on each side of the truck providing a continuation of the platform for substantially the entire length of the body, and in close proximity thereof.

9. The combination with a platform having a truck pit associated therewith, of a shiftable trackway carried by the platform on each side of the pit and means for moving the trackways over part of the truck pit so as to provide a close fitting engagement with the sides of a truck positioned in the pit.

10. The combination of a freight platform having a truck pit associated therewith, a trackway mounted on a shiftable pivot on each side of the pit and means for moving each trackway laterally and swinging it about the pivotal connection for enabling a close fitting engagement to be made with a truck positioned in the pit.

11. The combination with a platform having a truck pit associated therewith, of a plurality of telescopic beams mounted on the platform on each side of the pit and adapted to overhang the pit, a plate having a pivotal connection with one of the beams, and having a pin and slot connection with the remaining beams on each side of the pit, said plates providing a trackway, and said connections functioning to permit each trackway to be disposed at an angle to the side of the pit while overhanging the same.

12. The combination with a platform having a truck pit associated therewith, of three members carried by the platform and adapted to be moved in substantially parallel paths so as to overhang the pit, a plate pivotally mounted on the middle member, and having a pin and slot connection with the end members, whereby the members may be moved at substantially right angles to the side of the pit, and whereby each plate may have one edge thereof disposed at an oblique angle to the side of the pit, and means for effecting simultaneous movement of said members.

In testimony whereof, I hereunto affix my signature.

BENJAMIN F. FITCH.